US011164337B2

United States Patent
Chang et al.

(10) Patent No.: US 11,164,337 B2
(45) Date of Patent: Nov. 2, 2021

(54) AUTOCALIBRATION FOR MULTIPLE CAMERAS USING NEAR-INFRARED ILLUMINATORS

(71) Applicant: Google LLC, Mountain View, CA (US)

(72) Inventors: Edward T. Chang, Saratoga, CA (US); Mykhaylo Kurinnyy, Milpitas, CA (US); Zhaowei Wang, Sunnyvale, CA (US); Jonathan James Taylor, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/956,730

(22) PCT Filed: Oct. 4, 2019

(86) PCT No.: PCT/US2019/054712
§ 371 (c)(1),
(2) Date: Jun. 22, 2020

(87) PCT Pub. No.: WO2021/066839
PCT Pub. Date: Apr. 8, 2021

(65) Prior Publication Data
US 2021/0248782 A1 Aug. 12, 2021

(51) Int. Cl.
*G06T 7/80* (2017.01)
*G06T 7/73* (2017.01)
(Continued)

(52) U.S. Cl.
CPC .................. *G06T 7/85* (2017.01); *G06T 7/74* (2017.01); *H04N 13/239* (2018.05);
(Continued)

(58) Field of Classification Search
CPC ....................................................... G06T 7/85
(Continued)

(56) References Cited

U.S. PATENT DOCUMENTS

| 7,099,056 B1 | 8/2006 | Kindt |
| 7,542,628 B2 | 6/2009 | Lolacono et al. |

(Continued)

FOREIGN PATENT DOCUMENTS

| CN | 109145653 | 1/2019 |
| WO | 2018005073 | 1/2018 |

(Continued)

OTHER PUBLICATIONS

"A Review of Multimodal Facial Biometric Authentication Methods in Mobile Devices and their Application in Head Mounted Displays", 2018 IEEE SmartWorld, Ubiquitous Intelligence & Computing, Advanced & Trusted Computing, Scalable Computing & Communications, Cloud & Big Data Computing, Internet of People and Smart City Innovations, 2018, 8 pages.

(Continued)

*Primary Examiner* — Amir Shahnami
(74) *Attorney, Agent, or Firm* — Colby Nipper PLLC

(57) ABSTRACT

This document describes techniques and systems that enable autocalibration for multiple cameras using near-infrared (NIR) illuminators. The techniques and systems include a user device that uses NIR images, including dot images and flood images, captured by the multiple cameras. The user device implements an autocalibration module that normalizes the contrast of each image. Then, the autocalibration module detects dot features in the dot images and detects flood features in the flood images. The autocalibration module uses the flood features to disambiguate the dot features in the dot images. Then, the autocalibration module uses the disambiguated dot features to determine new calibration parameters for recalibration of the multiple cameras. In some aspects, the autocalibration module uses the dot images, rather than the flood images, to detect the flood features for disambiguating the dot features.

20 Claims, 9 Drawing Sheets

(51) Int. Cl.
  *H04N 13/239* (2018.01)
  *H04N 13/254* (2018.01)
(52) U.S. Cl.
  CPC . *H04N 13/254* (2018.05); *G06T 2207/10012* (2013.01); *G06T 2207/10048* (2013.01); *G06T 2207/30204* (2013.01); *G06T 2207/30244* (2013.01)
(58) Field of Classification Search
  USPC .......................................................... 348/47
  See application file for complete search history.

(56) References Cited

U.S. PATENT DOCUMENTS

| | | | |
|---|---|---|---|
| 8,483,479 | B2 | 7/2013 | Kunkel et al. |
| 8,798,378 | B1 | 8/2014 | Babenko et al. |
| 8,890,975 | B2 | 11/2014 | Baba et al. |
| 8,982,238 | B2 | 3/2015 | Liu et al. |
| 9,253,412 | B2 | 2/2016 | Lee |
| 9,491,452 | B2 | 11/2016 | Meloun et al. |
| 9,619,633 | B1 | 4/2017 | Mortensen |
| 9,686,475 | B2 | 6/2017 | Neglur |
| 9,774,798 | B1 | 9/2017 | Evans, V et al. |
| 10,015,408 | B2 | 7/2018 | Shabtay et al. |
| 10,521,952 | B2 | 12/2019 | Ackerson et al. |
| 2003/0068100 | A1 | 4/2003 | Covell et al. |
| 2005/0099494 | A1 | 5/2005 | Deng et al. |
| 2005/0265626 | A1 | 12/2005 | Endo et al. |
| 2006/0104488 | A1 | 5/2006 | Bazakos et al. |
| 2007/0025714 | A1 | 2/2007 | Shiraki |
| 2009/0207266 | A1 | 8/2009 | Yoda |
| 2011/0090303 | A1 | 4/2011 | Wu et al. |
| 2011/0261217 | A1 | 10/2011 | Muukki et al. |
| 2014/0009639 | A1 | 1/2014 | Lee |
| 2015/0156388 | A1 | 6/2015 | Neglur |
| 2015/0348580 | A1 | 12/2015 | Van Hoff et al. |
| 2016/0234023 | A1 | 8/2016 | Mozer et al. |
| 2016/0283789 | A1 | 9/2016 | Slaby et al. |
| 2016/0309065 | A1 | 10/2016 | Karafin et al. |
| 2016/0337570 | A1 | 11/2016 | Tan et al. |
| 2017/0116932 | A1 | 4/2017 | Musgrave et al. |
| 2018/0249142 | A1 | 8/2018 | Hicks et al. |
| 2018/0336399 | A1 | 11/2018 | Gernoth et al. |
| 2018/0367681 | A1 | 12/2018 | Xu et al. |
| 2019/0042835 | A1 | 2/2019 | Mostafa et al. |
| 2019/0138793 | A1 | 5/2019 | Rodriguez |
| 2019/0171908 | A1 | 6/2019 | Salavon |

FOREIGN PATENT DOCUMENTS

| | | |
|---|---|---|
| WO | 2018188535 | 10/2018 |
| WO | 2018198690 | 11/2018 |
| WO | 2019027503 | 2/2019 |
| WO | 2021050042 | 3/2021 |
| WO | 2021061112 | 4/2021 |
| WO | 2021071497 | 4/2021 |

OTHER PUBLICATIONS

"International Search Report and Written Opinion", PCT Application No. PCT/US2019/054712, dated Jan. 10, 2020, 15 pages.
"International Search Report and Written Opinion", PCT Application No. PCT/US2019/050245, dated May 12, 2020, 42 pages.
"International Search Report and Written Opinion", PCT Application No. PCT/US2019/055669, dated May 28, 2020, 20 pages.
"Invitation to Pay Additional Fees", PCT Application No. PCT/US2019/052860, dated Jun. 12, 2020, 12 pages.
"PL-D Camera Synchronization Methods", Retrieved from the internet at https://support.pixelink.com/support/solutions/articles/3000085024-pl-d-camera-synchronization-methods, Aug. 1, 2019, 9 pages.
Chang, "Measuring Stereo Camera Alignment Using Depth Map Smoothness", Technical Disclosure Commons; Retrieved from https://www.tdcommons.org/dpubs_series/2580, Oct. 17, 2019, 9 pages.
Chen, "Enhancing Image Quality of Photographs Taken by Portable Devices by Matching Images to High Quality Reference Images Using Machine Learning and Camera Orientation and Other Image Metadata", Technical Disclosure Commons; Retrieved from https://www.tdcommons.org/dpubs_series/2717, Nov. 25, 2019, 14 pages.
Cho, "Motion Blur Removal from Photographs", Massachusetts Institute of Technology, Sep. 2010, Sep. 2010, 143 pages.
Fried, et al., "Perspective-Aware Manipulation of Portrait Photos", SIGGRAPH '16 Technical Paper, Jul. 24-28, 2016, Anaheim, CA, Jul. 2016, 10 pages.
Gao, et al. "Scene Metering and Exposure Control for Enhancing High Dynamic Range Imaging", Technical Disclosure Commons; Retrieved from https://www.tdcommons.org/dpubs_series/3092, Apr. 1, 2020, 12 pages.
Hahne, "Real-Time Depth Imaging", Retrieved from https://d-nb.info/1023762218/34, May 3, 2012, 108 pages.
Hong, et al., "Method of Capturing a Video and a Set of Selected High-Quality Images During Camera Shutter Long-Press", Technical Disclosure Commons; Retrieved from https://www.tdcommons.org/dpubs_series/2757, Dec. 12, 2019, 10 pages.
Jain, et al., "On Detecting GANs and Retouching Based Synthetic Alterations", Nov. 26, 2019, 7 pages.
Khoshelham, et al., "Accuracy and Resolution of Kinect Depth Data for Indoor Mapping Applications", Retrieved from https://www.researchgate.net/publication/221967616_Accuracy_and_Resolution_of_Kinect_Depth_Data_for_Indoor_Mapping_Applications, Feb. 1, 2012, 18 pages.
Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.
Moraldo, "Virtual Camera Image Processing", Technical Disclosure Commons; Retrieved from https://www.tdcommons.org/dpubs_series/3072, Mar. 30, 2020, 10 pages.
Portmann, et al., "Detection of Automated Facial Beautification by a Camera Application by Comparing a Face to a Rearranged Face", Technical Disclosure Commons, Retrieved from https://www.tdcommons.org/dpubs_series/2943, Feb. 9, 2020, 11 pages.
Tillman, "What is Apple Face ID and How Does it Work?", Retrieved from the internet at https://www.pocket-lint.com/phones/news/apple/142207-what-is-apple-face-id-and-how-does-it-work on May 13, 2020, Sep. 18, 2019, 10 pages.
Xompero, et al., "Multi-camera Matching of Spatio-Temporal Binary Features", 2018 21st International Conference on Information Fusion (FUSION), 2018, 8 pages.
Yang, et al., "Improved Object Detection in an Image by Correcting Regions with Distortion", Technical Disclosure Commons; Retrieved from https://www.tdcommons.org/dpubs_series/3090, Apr. 1, 2020, 8 pages.
Yang, et al., "Using Image-Processing Settings to Determine an Optimal Operating Point for Object Detection on Imaging Devices", Technical Disclosure Commons; Retrieved from https://www.tdcommons.org/dpubs_series/2985, Mar. 4, 2020, 10 pages.
Gao, et al., "Camera Sensor Exposure Control During Camera Launch", Nov. 24, 2020, 7 pages.
"International Search Report and Written Opinion", Application No. PCT/US2019/052860, dated Jul. 20, 2020, 27 pages.
Jackson, "The Creative and Technical Differences Between Full Frame and S-35", Accessed from: https://vmi.tv/training/useful-stuff/differences-between-full-frame-and-s-35, Feb. 2020, 19 pages.
Talvala, et al., "Techniques and Apparatuses for Variable-Display Devices to Capture Screen-Fitting Images with a Maximized Field of View", Technical Disclosure Commons; Retrieved from https://www.tdcommons.org/dpubs_series/3388, Jun. 29, 2020, 8 pages.
"Foreign Office Action", EP Application No. 19797409.0, dated Jul. 16, 2021, 4 pages.

AUTOCALIBRATION FOR MULTIPLE CAMERAS USING NEAR-INFRARED ILLUMINATORS

BACKGROUND

Computer security using face authentication solutions provides a convenient and simple way for users to securely access accounts or sign transactions, which enhances the user experience. A user device may capture images for face authentication using stereo cameras, which generally require accurate calibration to enable depth measurements. Events may happen to the cameras, however, that invalidate their factory calibration. For example, the user device may be dropped onto a hard surface, which can move one or both cameras out of alignment. Another example includes thermal expansion, which can change the camera calibration at different temperatures. Typical autocalibration solutions that do not have external illumination may fail due to insufficient texture in a scene for the cameras to identify key points for calibration.

SUMMARY

This document describes techniques and systems that enable autocalibration for multiple cameras using near-infrared (NIR) illuminators. The techniques and systems include a user device that uses NIR images, including dot images and flood images, captured by the multiple cameras. The user device implements an autocalibration module that normalizes the contrast of each image. Then, the autocalibration module detects dot features in the dot images and detects flood features in the flood images. The autocalibration module uses the flood features to disambiguate the dot features in the dot images. Then, the autocalibration module uses the disambiguated dot features to determine new calibration parameters for recalibration of the multiple cameras. In some aspects, the autocalibration module uses the dot images, rather than the flood images, in a flood pipeline to detect flood features in the dot images for disambiguating the dot features.

This summary is provided to introduce simplified concepts concerning autocalibration for multiple cameras using near-infrared illuminators, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of autocalibration for multiple cameras using near-infrared illuminators are described in this document with reference to the following drawings. The same numbers are used throughout the drawings to reference like features and components.

DETAILED DESCRIPTION

Overview

Figure 1:
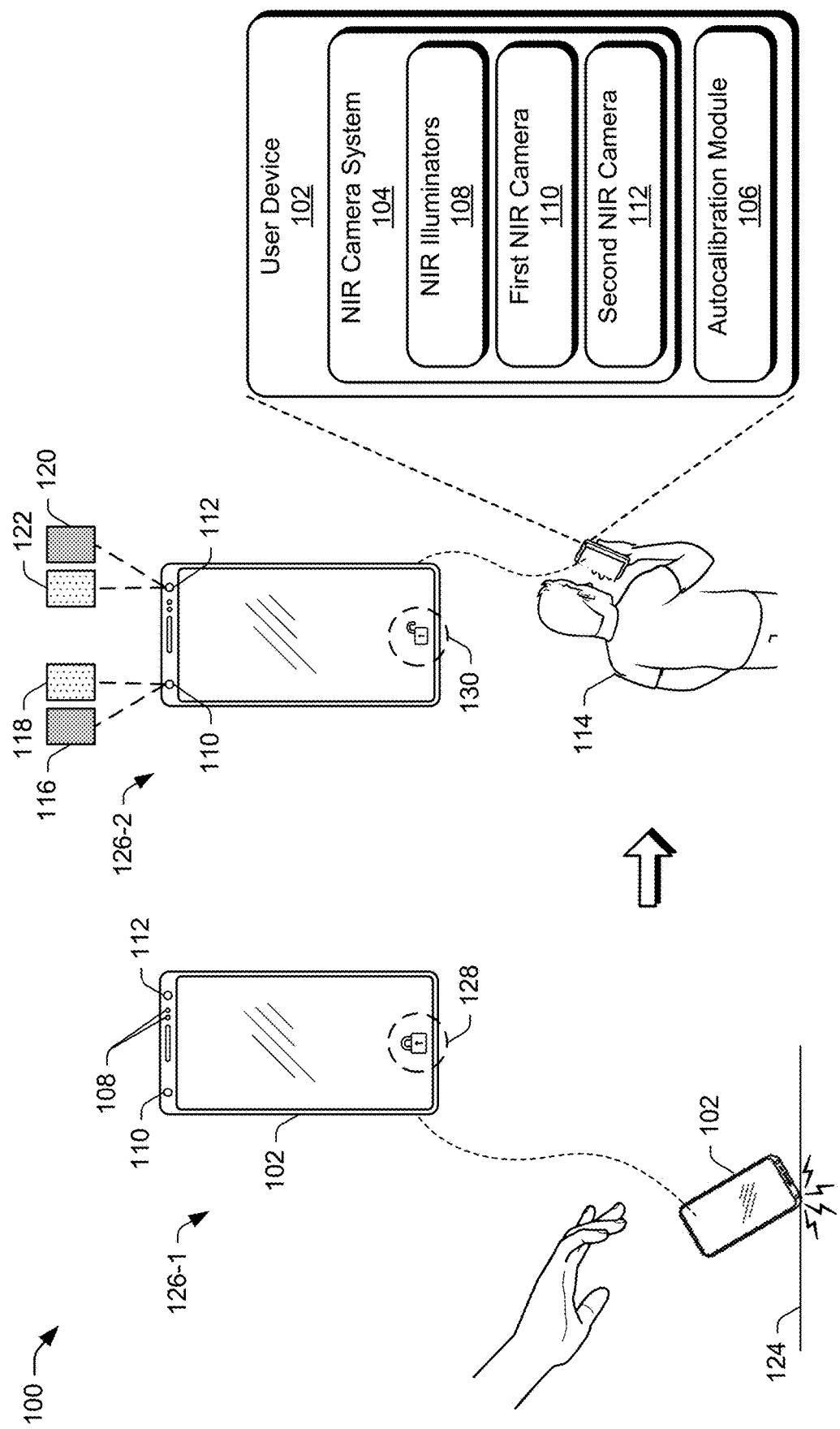
FIG. 1 illustrates an example environment in which techniques for autocalibration of for multiple cameras using near-infrared illuminators can be implemented.

This document describes techniques and systems that enable autocalibration for multiple cameras using near-infrared illuminators. Calibration of a multi-camera system, such as stereo cameras, can be invalidated based on various events including impact forces or thermal expansion. General autocalibration solutions may fail for multi-camera systems, which do not use external illumination, due to insufficient texture on a scene for the cameras to identify key points for calibration. To provide a reliable autocalibration technique for multi-camera systems that do not use external illumination in the visible spectrum, such as stereo near-infrared (NIR) cameras using near-infrared illuminators, techniques and systems are described to find correspondences between a pair of images captured by the stereo near-infrared cameras and then to feed the correspondences into an optimization solver that provides a new calibration for the cameras. More specifically, the cameras capture a pair of dot images, based on NIR light output by a dot projector, and a pair of flood images, based on NIR light output by a flood projector. The pair of dot images are fed into a dot pipeline to determine dot features. The pair of flood images are fed into a flood pipeline to detect flood-feature matches between the pair of flood images. Then, the flood-feature matches are used to resolve ambiguities between the dot features in the pair of dot images, which enables dot features to be matched between the dot images. Using the matching dot features, a solver produces camera calibration patterns that minimize an error between the matching dot features from each image in the pair of dot images (e.g., left and right dot images), and estimates new calibration parameters with which to update the cameras.

In aspects, a method for autocalibration for multiple cameras using near-infrared illuminators performed by a user device is described. The method includes receiving a plurality of images from a stereo near-infrared camera system, the plurality of images including dot images and flood images. The method also includes normalizing a contrast of the images to provide normalized dot images and normalized flood images. In addition, the method includes detecting dot features in each normalized dot image. Further, the method includes detecting flood features in each normalized flood image by identifying locations of feature points in the normalized flood images and determining a surrounding context of the feature points; determining flood-feature matches based on a comparison of the flood features between the normalized flood images. Also, the method includes using the flood-feature matches to disambiguate the detected dot features to determine dot-feature correspondences between the normalized dot images. Additionally, the method includes determining updated-calibration parameters for the stereo near-infrared camera system based on the dot-feature correspondences. The updated-calibration parameters are used for image capture using the stereo near-infrared camera system.

In aspects, a method for autocalibration for multiple cameras using near-infrared illuminators in a user device is described. The method includes receiving a pair of dot images from a stereo near-infrared camera system and normalizing a contrast of each dot image to provide a pair of normalized dot images. The method also includes, in a dot pipeline, detecting dot features in each of the normalized dot images. Further, the method includes, in a flood pipeline: detecting flood features in local regions of each of the normalized dot images, the flood features corresponding to feature-point locations and descriptors of surrounding context of the feature-point locations; and determining flood-feature matches based on a comparison of the flood features between the pair of normalized dot images. Additionally, the method includes using the flood-feature matches to disambiguate the detected dot features and determine dot-feature correspondences between the pair of normalized dot images. Also, the method includes determining updated-calibration parameters for the stereo near-infrared camera system based on the dot-feature correspondences.

These are but a few examples of how the described techniques and devices may be used to enable autocalibration for multiple cameras using near-infrared illuminators. Other examples and implementations are described throughout this document. The document now turns to an example operating environment, after which example devices, methods, and systems are described.

Operating Environment

FIG. 1 illustrates an example environment 100 in which techniques enabling autocalibration for multiple cameras using near-infrared illuminators can be implemented. The example environment 100 includes a user device 102 (e.g., electronic device), which includes, or is associated with, a near-infrared (NIR) camera system 104, an autocalibration module 106. As further described below, the NIR camera system 104 is a stereo camera system, which includes NIR illuminators 108, a first NIR camera 110, and a second NIR camera 112. The NIR camera system 104 is implemented to capture images of a user 114 for face authentication to unlock the user device 102. The images are captured using near-infrared (NIR) light, which generally refers to light within a range of wavelengths between approximately 750 nm and 2,500 nm. The NIR light is invisible to the human eye and therefore can be used to capture images of the user 114 without external illumination (e.g., in the dark). As further described below, the NIR illuminators 108 project a dot pattern of NIR light and also a flood of NIR light. The first NIR camera 110, positioned on the device's right side (user's left when the device is facing the user), captures a right flood image 116 and a right dot image 118. Similarly, the second NIR camera 112, positioned on the device's left side (user's right when the device is facing the user), captures a left flood image 120 and a left dot image 122.

If the user device 102 experiences an impact force, such as by being dropped onto a hard surface 124, the first NIR camera 110 and the second NIR camera 112 can be physically moved within the user device 102, which invalidates the calibration of the cameras relative to one another. The user device 102 may experience thermal expansion (not shown), which can also negatively affect the calibration of the stereo cameras by physically altering their positions. The next time the user 114 attempts to unlock the user device 102 using face authentication, the unlock attempt may fail due to a miscalibration of the first and second NIR cameras 110, 112. For example, facial features of the user 114 in each of the left and right images are unlikely to match, resulting in data that cannot be validated against known profile data for unlocking the user device 102.

To address these calibration invalidators, these techniques autocalibrate the user device 102 using the images captured by the NIR camera system 104. By so doing, these techniques automatically update the calibration of the first NIR camera 110 and the second NIR camera 112. The autocalibration module 106 can perform the autocalibration during a face-authentication attempt to unlock the user device 102 using the NIR camera system 104. If the authentication is rejected, the user device 102 remains in a locked state 126-1, as represented by a lock icon 128. If the user 114 is authenticated, the user device 102 transitions to the unlocked state 126-2, as represented in FIG. 1 by an unlock icon 130.

Throughout this disclosure examples are described where a computing system (e.g., the user device 102, a client device, a server device, a computer, or other type of computing system) may analyze information (e.g., radar, inertial, and facial-recognition sensor data) associated with a user, such as the just-mentioned facial features. The computing system, however, can be configured to only use the information after the computing system receives explicit permission from the user of the computing system to use the data. For example, in situations where the user device 102 analyzes sensor data for facial features to authenticate the user 114, the sensor data is contained in a secure pipeline and cannot be removed from this secure pipeline. The individual users may have constant control over what programs can or cannot do with sensor data. In addition, information collected may be pre-treated in one or more ways before it is transferred, stored, or otherwise used, so that personally identifiable information is removed. For example, before the user device 102 shares sensor data with another device (e.g., to train a model executing at another device), the user device 102 may pre-treat the sensor data to ensure that any user-identifying information or device-identifying information embedded in the data is removed. Thus, the user may have control over whether information is collected about the user and the user's device, and how such information, if collected, may be used by the computing device and/or a remote computing system.

Figure 2:
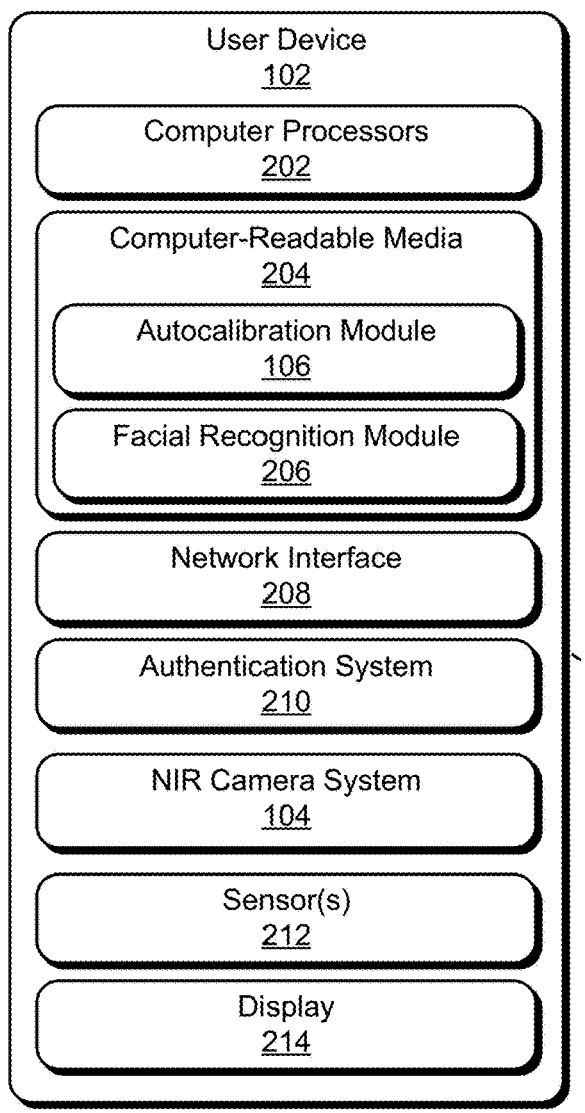
FIG. 2 illustrates an example implementation of the user device of FIG. 1 that includes an autocalibration module for calibrating multiple cameras.
Figure 2:
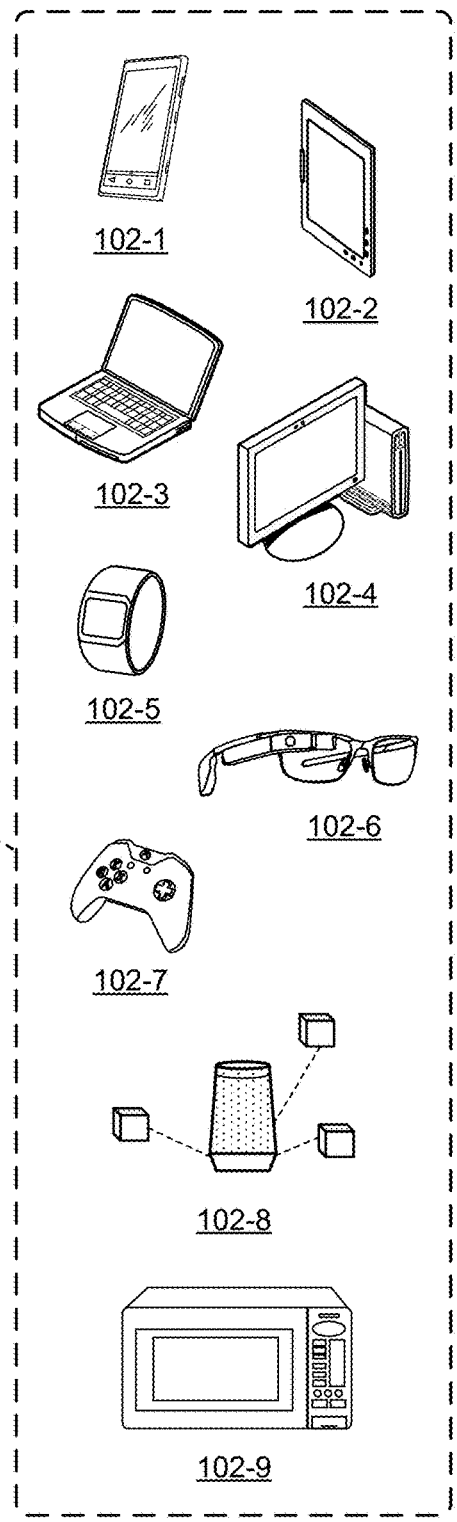

In more detail, consider FIG. 2, which illustrates an example implementation 200 of the user device 102 that can implement autocalibration for multiple cameras using near-infrared illuminators. The user device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The user device 102 can also include other devices, such as televisions, entertainment systems, audio systems, automobiles, drones, trackpads, drawing pads, netbooks, e-readers, home security systems, and other home appliances. Note that the user device 102 can be wearable, non-wearable but mobile, or relatively immobile (e.g., desktops and appliances).

The user device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. For example, the computer-readable media 204 can include the autocalibration module 106 and a facial recognition module 206. The computer-readable media 204 includes secure storage (not shown), which is not accessible by processes or applications in the userspace. The secure storage is configured to store security data (e.g., user credentials) used for privacy controls, such as controls to unlock the user device 102 (including face authentication data, password/passcode information, fingerprint data, and so on). Although this security data can be used to authenticate the user 114 to unlock the user device 102 using face authentication, password/passcode authentication, fingerprint authentication, and so on, personally identifiable information about the user 114 cannot be obtained by the security data. Specifically, the user 114 cannot be identified by the security data. Rather, with previously obtained explicit permission from the user, the security data is used to determine whether data received from a user attempting to unlock the phone matches stored profile data representing the user that set up the security on the user device 102. In an example, the embeddings generated from captured NIR images of the user's face are numerical vector representations of facial features of the user 114 and are used during a face-authentication attempt for comparison to previously-stored embeddings to locate a match.

The facial recognition module 206 can call on a machine-learned model to use NIR images (e.g., images 116, 118, 120, 122), captured by the NIR camera system 104, to generate authentication data usable to validate against stored security data in order to authenticate the user 114 and unlock the user device 102. The computer-readable media 204 includes the stored profile, which is not accessible by processes or applications in the userspace.

The user device 102 may also include a network interface 208. The user device 102 can use the network interface 208 for communicating data over wired, wireless, or optical networks. By way of example and not limitation, the network interface 208 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

The user device 102 may also include an authentication system 210. Various implementations of the authentication system 210 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. As described in further detail below, the authentication system 210 can, in a secure mode, implement the facial recognition module 206 to compare authentication data, received from the user 114, to security data stored in secure storage for authenticating the user 114 to unlock the user device 102. In some aspects, the authentication system 210 generates the authentication data using image data obtained from the NIR camera system 104 and provides the authentication data to the secure storage to enable the secure storage to compare the authentication data to stored security data and determine if there is a match.

Figure 3:
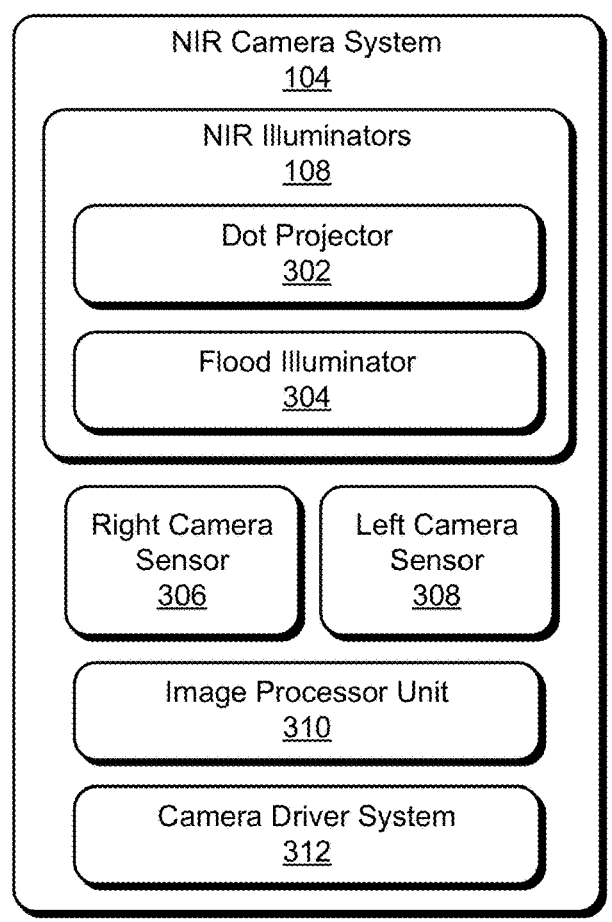
FIG. 3 illustrates an example stereo near-infrared camera system.

The NIR camera system 104 is implemented to capture NIR image data usable to generate a three-dimensional depth map of an object, such as a user's face. The NIR camera system 104 is described in FIG. 3 in more detail. As illustrated in FIG. 3, the NIR camera system 104 includes the NIR illuminators 108, which include a dot projector 302 and a flood illuminator 304. The NIR camera system 104 also includes a left camera sensor 308, a right camera sensor 306, an image processor unit 310, and a camera driver system 312.

The NIR illuminators 108 project light in the near-infrared spectrum and include the dot projector 302 and the flood illuminator 304. The flood illuminator 304 illuminates a subject with a dedicated flash of NIR light. The right and left camera sensors 306, 308 (e.g., the first NIR camera 110 and the second NIR camera 112, respectively) each capture an image (referred to herein as a flood image) of the subject based on the NIR light output by the flood illuminator 304 by capturing photons from the NIR light reflecting off of the subject. The dot projector 302 projects plurality (e.g., hundreds, thousands) of NIR dots onto the subject and the right and left camera sensors 306, 308 each capture an image (referred to herein as a dot image) of the resulting dot pattern. The image processor unit 310 reads the image and the dot pattern and generates a three-dimensional facial map. Because multiple (e.g., two) cameras are used, the image processor unit 310 calculates a difference between matching points on the different captured images, which provides a depth measurement for respective pixels that is usable for generating the three-dimensional facial map.

The camera driver system 312 enables communication between the NIR camera system 104 and other components of the user device 102, such as the computer processors 202, the autocalibration module 106, and the authentication system 210. The camera driver system 312 can be initiated by any suitable trigger, such as a user input received via an actuated control or a pressed button, or a signal received from one or more sensors 212. In an example, proximity sensors can transmit a signal indicating that the user 114 is proximate to the user device 102 and is likely, because of the proximity, to attempt to unlock the user device 102 using face authentication. The camera driver system 312 also controls the settings for the right and left camera sensors 306, 308, including calibration parameters.

Returning to FIG. 2, the autocalibration module 106 can, as mentioned above and further described below, use the captured images from the NIR camera system 104 to determine a calibration update for the right and left camera sensors 306, 308. The autocalibration module 106 may perform a calibration update at any suitable time, such as during a face-authentication attempt when a pair of dot images and/or a pair of flood images captured by the right and left camera sensors 306, 308 fail to produce a sufficient amount of correspondences (e.g., matching features between left and right dot images and/or between left and right flood images) to enable depth measurements. In one aspect, the autocalibration module 106 sends the pair of dot images through a dot pipeline and separately sends the pair of flood images through a flood pipeline. Outputs of the flood pipeline are combined with outputs of the dot pipeline to disambiguate dot features in the dot images. Then, the autocalibration module 106 uses an iterative solver, such as a linear solver, to determine a calibration update for the right and left camera sensors 306, 308.

Alternatively, the autocalibration module 106 may use the pair of dot images as separate inputs to the dot pipeline and the flood pipeline. By processing local regions of the dot images in the flood pipeline, rather than globally processing the dot images, the flood pipeline can produce point features and descriptors usable to disambiguate the outputs of the dot pipeline. The autocalibration module 106 can then use an iterative solver, such as a non-linear solver, to determine the calibration update for the right and left camera sensors 306, 308.

The sensors 212 of the user device 102 can include any of a variety of sensors, such as an audio sensor (e.g., a microphone), a touch-input sensor (e.g., a touchscreen), an image-capture device (e.g., a camera or video-camera), proximity sensors (e.g., capacitive sensors), or an ambient light sensor (e.g., photodetector). In at least some implementations, the user device 102 can include a radar system (not shown) to detect a proximity of the user 114 to the user device 102, and based on that proximity, initiate one or more components and/or functions, such as initiating the NIR camera system 104 and the authentication system 210 to initiate a face-authentication attempt.

The user device 102 can also include a display device, such as display 214. The display 214 can include any suitable display device, such as a touchscreen, a liquid crystal display (LCD), thin film transistor (TFT) LCD, an in-place switching (IPS) LCD, a capacitive touchscreen display, an organic light-emitting diode (OLED) display, an active-matrix organic light-emitting diode (AMOLED) display, super AMOLED display, and so forth.

These and other capabilities and configurations, as well as ways in which entities of FIGS. 1-3 act and interact, are set forth in greater detail below. These entities may be further divided, combined, and so on. The environment 100 of FIG. 1 and the detailed illustrations of FIG. 2 through FIG. 9 illustrate some of many possible environments and devices capable of employing the described techniques.

Figure 4:
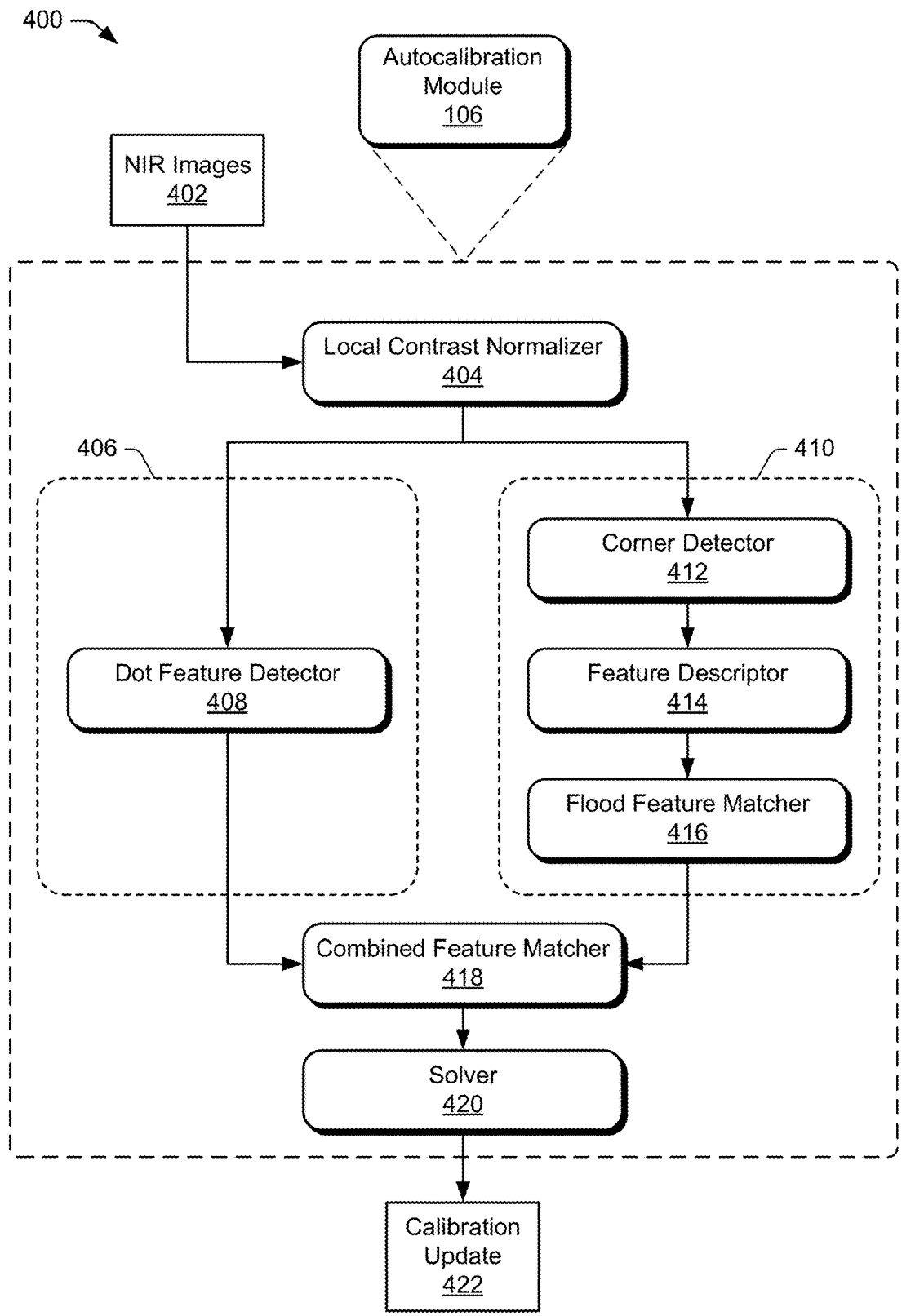
FIG. 4 illustrates an example schematic of an autocalibration module operable to calibrate multiple cameras that use near-infrared illuminators.

FIG. 4 illustrates an example schematic 400 of the autocalibration module, from FIG. 1, operable to calibrate multiple cameras using near-infrared illuminators. The autocalibration module 106 receives NIR images 402 from the NIR camera system 104 described with respect to FIGS. 1-3. The NIR images 402, as described above, include a pair of dot images and a pair of flood images. The pair of dot images may include the left dot image 122 and the right dot image 118. The pair of flood images may include the left flood image 120 and the right flood image 116. As described further below, in some aspects the NIR images 402 may include the pair of dot images without flood images. Each pair of images 402 may include a left image and a right image, captured by the left camera sensor 308 and the right camera sensor 306, respectively.

The autocalibration module 106 includes a local contrast normalizer 404 that normalizes the contrast of the NIR images 402 in a limited region. For example, the local contrast normalizer 404 may perform histogram equalization in each of a plurality of limited regions of the image. These regions may be any suitable size, including N×M pixels. In one example, N and M are equal. As the local contrast normalizer 404 sweeps an N×M filter across the image, it makes equalization changes. The changes normalize bright and dark portions of the image to a similar brightness, essentially greying out those portions and leaving behind edges in the image. The local contrast normalizer 404 normalizes the contrast of each dot image and each flood image.

The normalized dot images are passed to a dot pipeline 406, which includes a dot feature detector 408. The normalized flood images are passed to a flood pipeline 410, which includes a corner detector 412, a feature descriptor 414, and a flood feature matcher 416. The dot feature detector 408 is a matched filter that identifies locations of dots, which were projected by the dot projector 302 and captured by the right and left camera sensors 306, 308, in each of the left and right dot images 118, 122.

The corner detector 412 locates feature points (e.g., points of interest) in the normalized flood images and provides corresponding XY positions. Any suitable corner detector may be utilized to locate the feature points. One example corner detector includes a Features from Accelerated Segment Test (FAST) corner detector.

The feature descriptor 414 encodes the locations of the feature points detected by the corner detector 412. Any suitable feature descriptor may be utilized to encode the feature points, which provides surrounding context of the feature points. One example feature descriptor is a Binary Robust Independent Elementary Features (BRIEF) algorithm BRIEF provides a vector of bits that encodes information about a local area around the XY positions detected by the corner detector 412 in both of the left and right normalized flood images.

The flood feature matcher 416 matches feature locations between the left and right flood images and provides flood-feature matches. A flood feature refers to the combination of a detected corner and a corresponding descriptor at a location of the detected corner. In one example, the flood feature is the combination of a FAST detected corner and a BRIEF descriptor at the corner location. The flood feature matcher 416 compares flood features identified in the two flood images and produces matched correspondences. Several distance metrics can be used to determine the quality of a matched correspondence. In one example, the feature locations are matched between the left and right flood images based on a Hamming distance, which is a computation of cross-correlation between features. Further correspondence quality checks can also be implemented, including an expectation-maximization-like algorithm or other algorithms used to filter outlier correspondences to improve quality.

A combined feature matcher 418 uses outputs from the flood pipeline to disambiguate or filter outputs from the dot pipeline. More specifically, the combined feature matcher 418 determines correspondences between the two dot images by using the flood-feature matches and output by the flood feature matcher 416 to resolve ambiguities between dots in the left dot image 122 and dots in the right dot image 118. The flood-feature matches from the flood images are used as anchor points in the dot images to match additional dots surrounding the anchor points.

A solver 420 uses the matched correspondences between the right and left dot images to generate updated-calibration parameters 422 for the right and left camera sensors 306, 308. The solver 420 may be a linear solver, a non-linear solver, or a solver having a combination of linear and non-linear aspects. These and other capabilities and configurations are described in greater detail below with respect to FIGS. 5 and 6. These components and aspects of the autocalibration module 106 may be further divided, combined, and so on.

Figure 5:
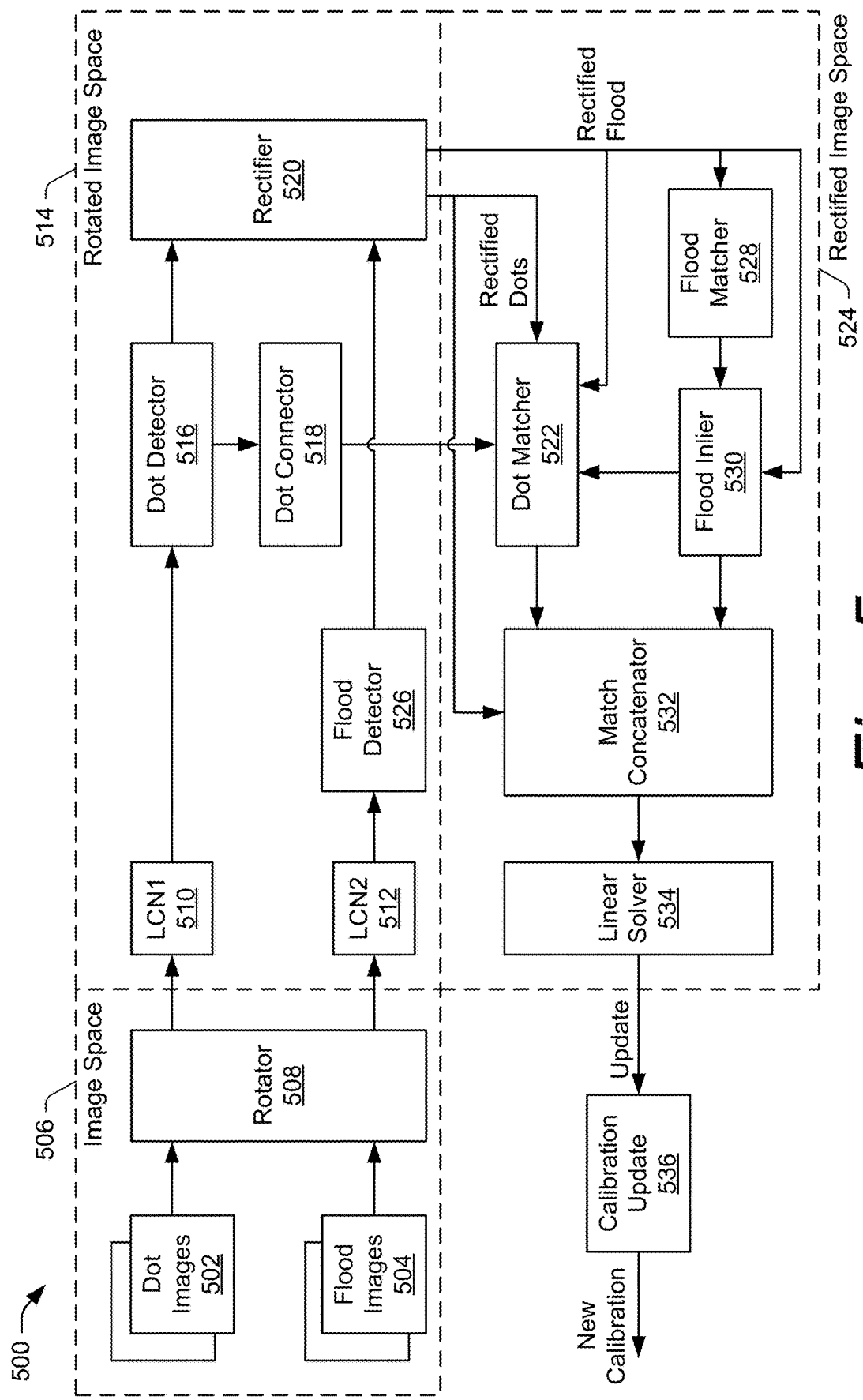
FIG. 5 illustrates an example schematic of the autocalibration module of FIG. 4 in further detail, in accordance with the use of a dot projector and a flood illuminator.

FIG. 5 illustrates an example schematic 500 of the autocalibration module of FIG. 4 in further detail, in accordance with the use of a dot projector and a flood illuminator. In the example schematic 500, dot images 502 and flood images 504, captured by the NIR camera system 104, are received by the autocalibration module 106 in an image space 506. The dot images 502 include a pair of dot images (e.g., left and right dot images captured by the left camera sensor 308 and the right camera sensor 306, respectively). The autocalibration module 106 includes a rotator 508 that rotates each of the dot and flood images 502, 504. Then, the autocalibration module 106 passes the rotated dot images to a first local contrast normalizer (LCN1 510) and the rotated flood images to a second local contrast normalizer (LCN2 512), which are both included in a rotated image space 514. The LCN1 510 and the LCN2 512 are each instances of the local contrast normalizer 404 in FIG. 4.

As above, the LCN1 510 normalizes the rotated dot images and provides normalized dot images to a dot detector 516. The dot detector 516 detects locations of dots in each of the normalized dot images. The dot detector 516 is a matched filter (e.g., linear filter) that compares sections of an input image against a known template of the dot pattern from the dot projector 302. In an example, the dot pattern is a five-point Quincunx grid, which includes four points forming a square and one point in the center of the square. The dot detector 516 sweeps the pattern across the image and marks a location corresponding to a match (e.g., five dots aligning with the five dots of the filter). The dot detector 516 outputs a numerical location of the dots in the image.

The normalization of the contrast of the dot image normalizes the response of the dot detector 516, effective to enable a single threshold (e.g., intensity threshold) to be used to determine what is deemed as a detected dot (e.g., set of matching responses) when analyzing the output of the linear filter in the dot detector 516. If the intensity of a matching response is above the threshold, then that matching response is determined to be a detected dot. Without the normalization of the contrast, there may be varying degrees of the response of the dot detector 516 across a field of view of the image based on various depths in the scene and various reflectances. These variances may result in some of the dots not being detected because they are over-exposed or under-exposed. For example, if the image includes a user with fair skin and wearing a dark jacket, then the dot detector 516 may detect bright dots (e.g., strong response) across the user's face and dim dots (e.g., weak response) across the jacket, and determine that the dim dots might not be considered detected dots. Normalizing the contrast first causes the bright and dim dots to have the same intensity and enables the response of the dot detector 516 to be relatively the same across the entire image, which makes the dots more easily identifiable by the filter.

Using a normalized image as the input to the dot detector 516 enables a single threshold to identify the locations of the dot patterns in the image. Without the normalization, darker areas would likely not trigger the filter threshold.

The dot detector 516 provides an output to a dot connector 518 and a rectifier 520. The dot connector 518 computes neighboring dots, given a starting dot. The starting dots are output by the dot detector 516, and the dot connector 518 identifies immediate closest neighbors to each starting dot on each dot image. Results of the dot connector 518 are passed to a dot matcher 522 in a rectified image space 524.

The rectifier 520 is a feature point rectifier, which undistorts and transforms feature points into a canonical space before the feature points are run through a matching algorithm to find correspondences between images (e.g., representing correspondences between cameras). The rectifier 520 uses an original calibration of the camera sensors to rectify the feature points. For example, if the two camera sensors 306, 308 are slightly out of position relative to one another, the rectifier 520 can transform a coordinate system of the XY locations of the dots in the left and right dot images into a canonical space, which enables the dots to be more accurately matched. The rectifier 520 provides an output of rectified dots to the dot matcher 522.

The LCN2 512 normalizes the rotated flood images and provides normalized flood images to a flood detector 526. The flood detector 526 includes the corner detector 412 and feature descriptor 414 from FIG. 4. The flood detector 526 provides feature point locations and feature descriptors from each of the flood images 504 to the rectifier 520. The rectifier 520 transforms the feature point locations from the flood images 504 into the canonical space described above. Then, the rectifier 520 outputs rectified flood-feature points to the dot matcher 522, a flood matcher 528, a flood inlier 530, and a match concatenator 532.

The flood matcher 528 (e.g., flood feature matcher 416) attempts to find matches between the XY positions and descriptors of the rectified flood-feature points in the left and right flood images. In aspects, the flood matcher 528 uses a cost function, such as the Hamming distance. The flood matcher 528 passes a set of detected matches to the flood inlier 530 to filter outliers of the detected matches. In aspects, the flood matcher 528 and the flood inlier 530 are implemented together as part of the flood feature matcher 416 in FIG. 4. Alternatively, the flood matcher 528 and the flood inlier 530 can be implemented separately.

The flood inlier 530 takes as input the set of initial matches between the left and right flood images and filters them to produce a subset of matches that has fewer incorrect matches than the set of initial matches. In an example, the flood inlier 530 implements a method similar to that of an expectation-maximization algorithm that determines which of the matches are correct matches and which are incorrect (e.g., outliers). In some instances, the flood images 504 may include noise that results in incorrect feature matches between the flood images 504. For example, if the flood images 504 include a wall with no interesting feature points, then due to noise in the flood images 504, several random matches can be identified that do not correspond to the same point. Accordingly, the flood inlier 530 removes the incorrect matches from the set of initial matches and outputs the correct matches.

In addition, the flood inlier 530 can include a first-to-second match correspondence filter to further filter outlier matches. When matching features from left to right in an image, there may be many candidates to match to a particular feature in the other image. This filter determines the cost of a best candidate and the cost of a second-best candidate. If the cost ratio between the two candidates is above a threshold value (e.g., similarity threshold), then they are each considered to be low-confidence matches and are consequently not matched to the particular feature in the other image. If the cost ratio is below the threshold value, then the best candidate may be considered a match to the particular feature in the other image and the second-best candidate is considered a mismatch.

The dot matcher 522 uses the rectified dots, the rectified flood-feature points, the output of the flood inlier 530, and the output of the dot connector 518 as input to determine matches between the dots in the left and right dot images 502. Presumably, substantially all the dots in the dot images 502 appear the same. Therefore, information from the flood images is used to match dots between the left and right dot images 502. In an example, the dot matcher 522 uses the matched locations from the flood images 504 as anchor points in the dot images to find correspondences between the left and right dot images 502. In particular, the dot matcher 522 uses the XY locations and the anchor point locations to identify additional matches in the dot images, such as dots surrounding the anchor points. In a simple example, imagine a flood-feature match that anchors two points together, one point in the left dot image 122 and one point in the right dot image 118. Using this information, the dot matcher 522 can also match dots that are in the neighborhood of the anchor points. The dot matcher 522 uses the anchor points and a combination of the dot neighbor information to provide an output, which includes pairs of indices (I, J) that indicate which feature (e.g., dot) in the left dot image 122 matches which feature in the right dot image 118.

The dot matcher 522 provides an output of dot correspondences to the match concatenator 532. In aspects, the dot matcher 522 and the match concatenator 532 are both part of the combined feature matcher 418 in FIG. 4. Alternatively, the dot matcher 522 and the match concatenator 532 can be implemented separately.

The match concatenator 532 uses the rectified dots (output by the rectifier 520), the dot correspondences (output by the dot matcher 522), and the correct flood-feature matches (output by the flood inlier 530) as input to combine the matches found as part of the flood pipeline and those found in the dot pipeline. Results are output to a linear solver 534.

The linear solver 534 comprises an iterative solver, such as an L1 solver, or an L2 solver, that produces camera calibration patterns that minimize a rectification error between matched correspondences from the left and right dot images. Essentially, the linear solver 534 makes a linear approximation of a non-linear problem. For example, points from the left image are warped into the right image to measure the misalignment (e.g., y-axis discrepancy) between the points. This enables a stereo algorithm for depth computation to be run on the same scan lines in the pair of images. The linear solver 534 attempts to fit the locations of the correspondences matched by the match concatenator 532 into new calibration parameters. In aspects, the linear solver 534 optimizes for focal length, roll (relative between the two camera sensors 306, 308), and vertical shift (relative between the two camera sensors 306, 308). To improve robustness, particularly when there are mismatches, the linear solver 534 may use an L1 error, rather than a squared error. The L1 error refers to least-absolute deviations. The linear solver 534 outputs an update to be made to the calibration parameters that minimizes the rectification error between the left and right dot images.

Based on the output of the linear solver 534, a calibration update 536 is made to the original calibration parameters of the camera sensors 306, 308 to provide a new calibration for the camera sensors 306, 308. The autocalibration module 106 passes the new calibration parameters to the camera driver system 312 to recalibrate the right and left camera sensors 306, 308 to capture additional dot and flood images.

Figure 6:
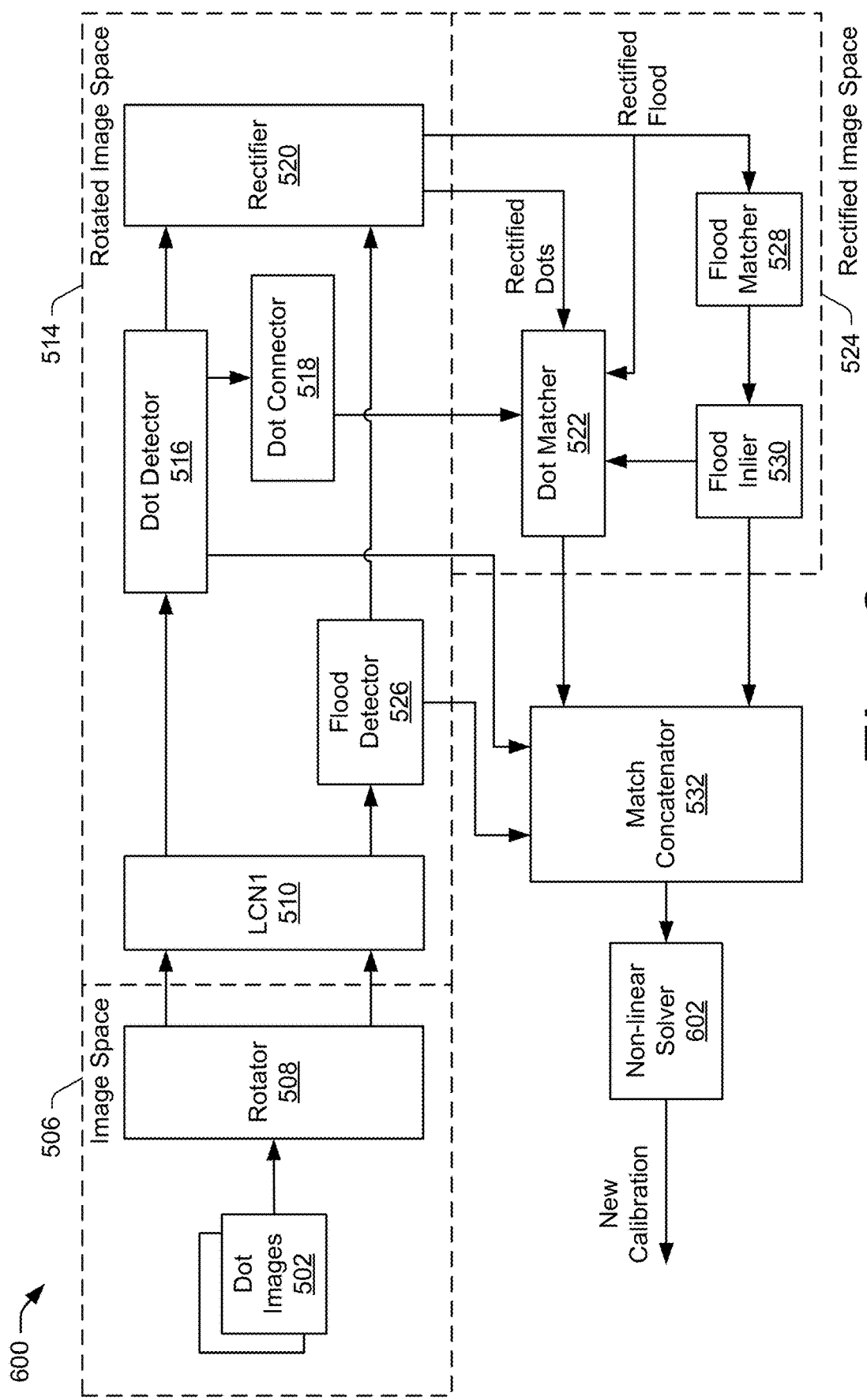
FIG. 6 illustrates an example schematic of the autocalibration module of FIG. 4 in further detail, in accordance with the use of a dot projector.

FIG. 6 illustrates an example schematic 600 of autocalibration of multiple cameras using a dot projector (without a flood illuminator). Many of the components illustrated in the schematic 600 are similar to those described in FIG. 5 and therefore are described above in further detail. Due to hardware constraints, the dot images are generally captured at a separate time from the flood images, which in some cases may result in aliasing when matching features between the images. Accordingly, the example schematic 600 provides an alternative in which only the dot images 502 (and the original-camera calibration parameters) are used as input for autocalibration of the multiple cameras. The flood images 504 are not used in this schematic 600 for autocalibration of the multiple cameras.

In the illustrated example, the pair of dot images 502 are used as input to the autocalibration module 106 for calibrating the camera sensors 306, 308. In the image space 506, the dot images 502 are rotated and passed to the LCN1 510 in the rotated image space 514. The LCN1 510 normalizes the contrast in each of the dot images, as described above. The LCN1 510 then outputs the same normalized dot images, as separate instances, to both the flood pipeline and the dot pipeline, described with respect to FIG. 4. For example, the LCN1 510 passes the normalized dot images to the dot detector 516, which detects the locations of dots in each of the normalized dot images. The LCN1 510 also provides the normalized dot images as output to the flood detector 526.

The dot detector 516 passes an output to the dot connector 518, the rectifier 520, and also the match concatenator 532. The rectifier 520 rectifies the detected dots output by the dot detector 516 to a canonical space based on the original calibration parameters of the camera sensors 306, 308 and outputs rectified dot locations to the dot matcher 522 in the rectified image space 524. The dot connector 518 takes the dot locations from the dot detector 516 and computes neighboring dots for each dot. Then the dot connector 518 passes an output to the dot matcher 522.

The flood detector 526, using the normalized dot images, provides XY positions and descriptors of flood features to each of the rectifier 520 and the match concatenator 532. The flood detector 526 determines the XY positions of the dots by searching limited areas (e.g., narrow slice on a y-axis and also limited length on an x-axis) of each of the dot images 502. Limiting the search area reduces ambiguities between dots and provides sufficient information (e.g., texture) in the images to faithfully match dots between the left and right dot images 502. The rectifier 520 undistorts and rectifies the XY positions and descriptors to provide rectified flood features to each of the dot matcher 522 and the flood matcher 528 in the rectified image space 524. The flood matcher 528 (e.g., flood feature matcher 416) attempts to find matches between the XY positions and descriptors of the rectified flood-feature points in the left and right flood images 504. The flood matcher 528 passes detected matches to the flood inlier 530 to filter outliers of the detected matches. The flood inlier 530 filters matches that are within a similarity threshold of another match, effective to remove incorrect matches and maintain correct matches. The flood inlier 530 outputs results to the dot matcher 522 and the match concatenator 532.

The dot matcher, as described above, uses the rectified dots, the rectified flood-feature points, the output of the flood inlier 530, and the output of the dot connector 518 as input to determine matches between the dots in the left and right dot images 502. The dot matcher 522 outputs dot correspondences between the two dot images 502 to the match concatenator 532 to use as anchor points in the dot images 502. The match concatenator 532 uses outputs from the flood detector 526, the dot detector 516, the dot matcher 522, and the flood inlier 530 to determine additional matching dots surrounding the anchor points. Results of the match concatenator 532 are then passed to a non-linear solver 602.

The non-linear solver 602 is configured to optimize a six-degrees-of-freedom (6-DOF) pose of one camera relative to the other camera, effective to minimize a non-linear objective function. The objective function includes extra nuisance and/or latent variables representing positions of N three-dimensional (3D) points in space that can plausibly explain a set of N matching detections in the two images. As such, the objective function is a weighted combination of two terms. The first term robustly measures reprojection error, derived by projecting a current estimate of the N 3D points in the two views and comparing to the detections. The second term penalizes 6-DOF pose estimates that are in low-confidence regions of a prior distribution fit to an empirical dataset of likely 6-DOF poses.

In aspects, the non-linear solver 602 attempts to find the 6-DOF pose of one camera relative to the other camera by solving for relative translation and rotation of the camera. To do this, the non-linear solver 602 optimizes a reprojection error. The reprojection error is a geometric error corresponding to an image distance between a projected point and a measured point. The reprojection error is used to quantify how closely an estimate of a 3D point recreates the point's observed detection in the two views. In contrast to the linear solver 534, which warps points from the left dot image 122 to the right dot image 118, the non-linear solver 602 optimizes over a hypothetical point cloud. For example, a point cloud is generated based on the non-linear solver optimizing for a 3D point corresponding to each match found. Then, using the current estimate of the calibration parameters, the point cloud is projected into each of the dot images 502 and the non-linear solver 602 measures the discrepancy in both x and y directions. The optimizer iteratively attempts to update both the calibration parameters and the positions of the points as to minimize this measured discrepancy. As a result, new calibration parameters for the camera sensors 306, 308 are obtained.

To improve robustness, the non-linear solver 602 measures L1 error instead of squared error. In an example, the non-linear solver 602 uses a Cauchy error metric or a truncated quadratic metric, which are more robust than the squared error. For example, if the reprojection error of a match is more than two or three pixels, then the influence of the match is diminished in preference of inlier matches.

In addition to measuring reprojection error, the optimizer may also be penalized from moving too far away from a distribution of likely poses (determined empirically). Thus, even if a 6-DOF estimate that is far outside of an expected range (e.g., poses determined to be unlikely empirically) yields a low reprojection error, the non-linear solver 602 can be discouraged from selecting it in preference of a more likely pose that yields a slightly higher reprojection error.

Example Methods

Figure 7:
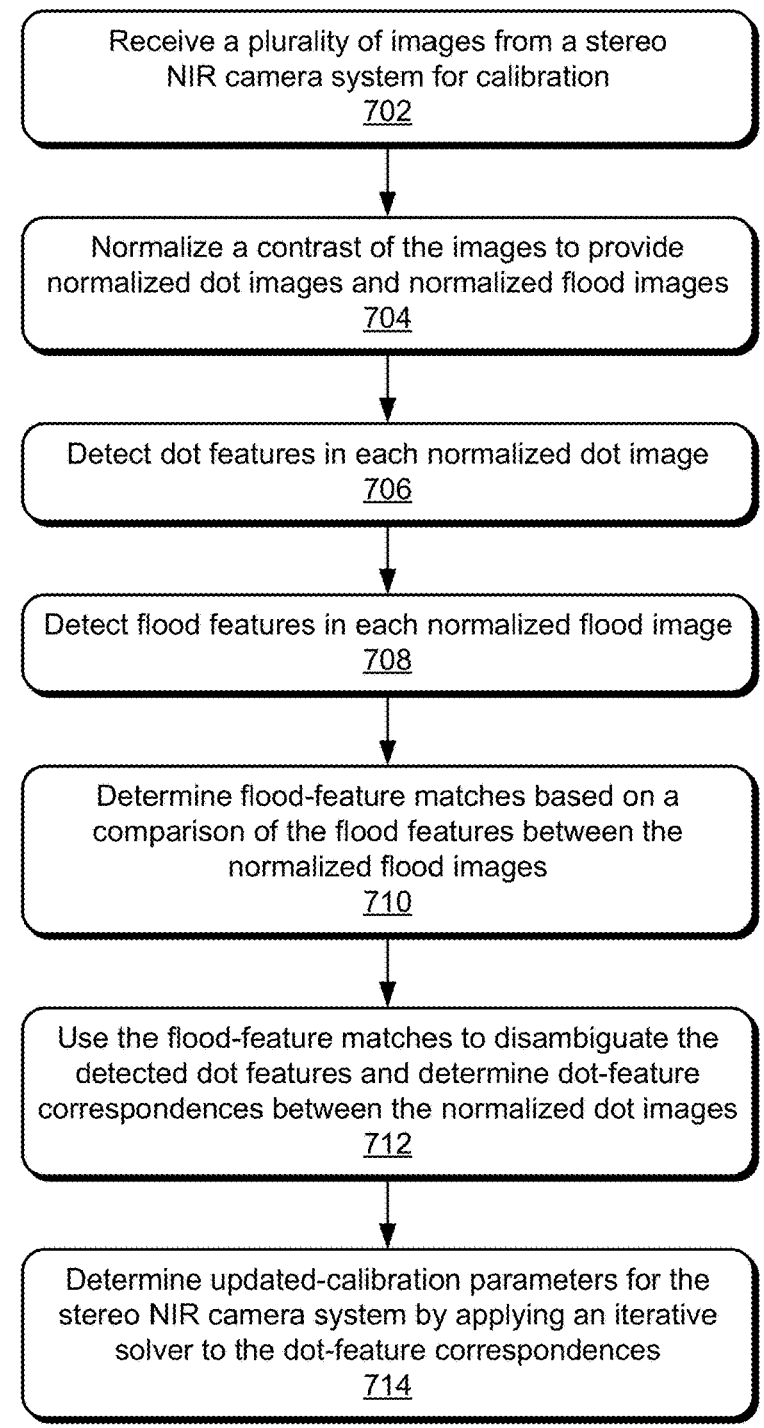
FIG. 7 depicts a method for autocalibration for multiple cameras using near-infrared illuminators, including a dot projector and a flood illuminator.
Figure 8:
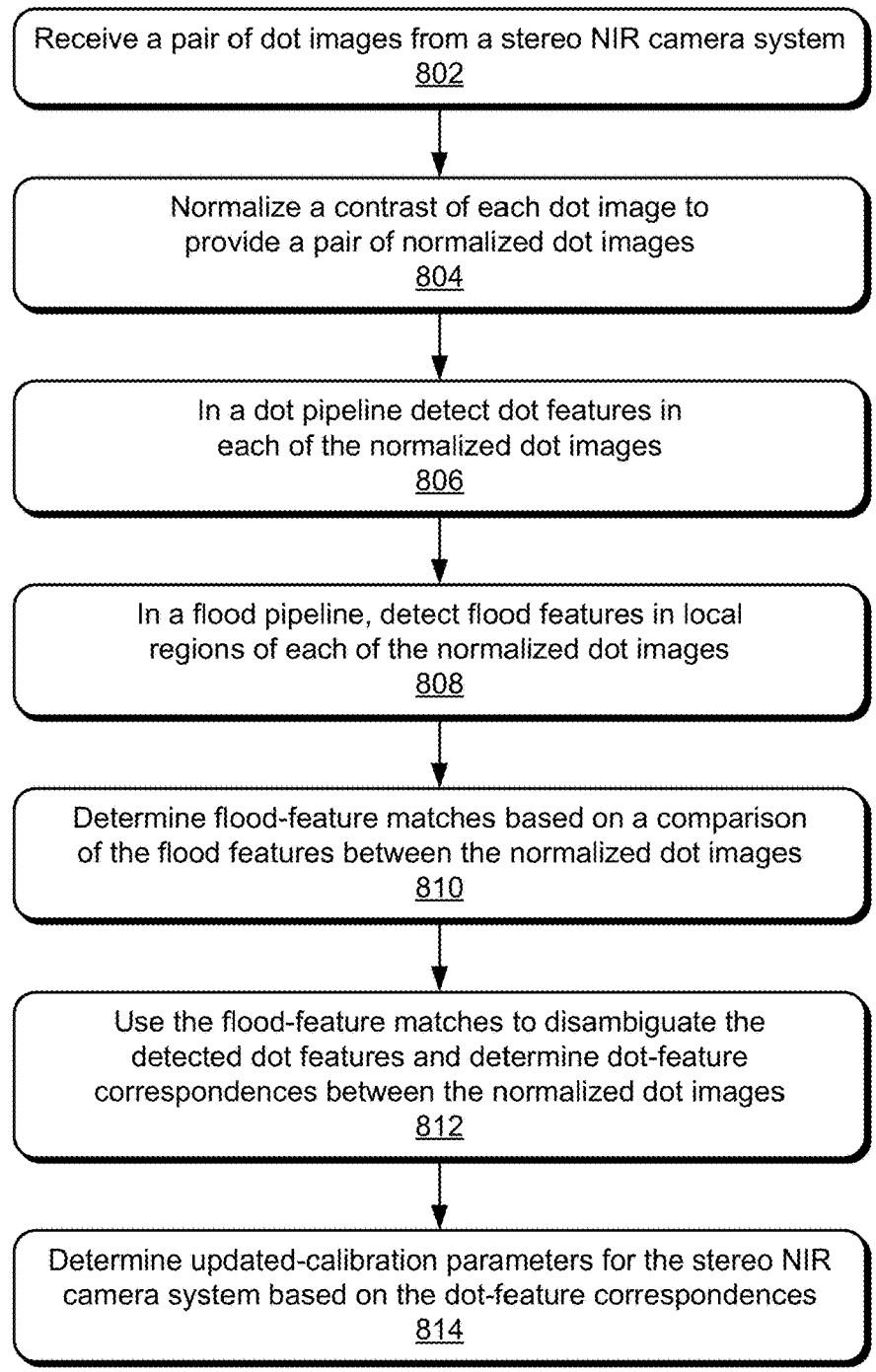
FIG. 8 depicts a method for autocalibration for multiple cameras using near-infrared illuminators, including a dot projector.

FIGS. 7 and 8 depict example methods 700 and 800 for autocalibration for multiple cameras using near-infrared illuminators. The methods 700 and 800 can be performed by the user device 102, which uses the autocalibration module 106 to automatically calibrate multiple cameras using NIR illuminators. The method 700 uses dot image and flood images as input for autocalibration. The method 800 uses dot images (no flood images) as input for autocalibration.

The methods 700 and 800 are shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-6, reference to which is made for example only. The techniques are not limited to performance by one entity or multiple entities operating on one device.

At 702, an autocalibration module receives a plurality of images from a stereo near-infrared camera system for calibration. For instance, the autocalibration module 106 receives the dot images 502 (e.g., the left dot image 122 and the right dot image 118) along with the flood images 504 (e.g., the left flood image 120 and the right flood image 116).

At 704, the autocalibration module normalizes a contrast of the images to provide normalized dot images and normalized flood images. For example, the local contrast normalizer 404 normalizes the contrast of each of the images 502, 504 and passes normalized dot images to the dot pipeline 406 and normalized flood images to the flood pipeline 410.

At 706, the autocalibration module detects dot features in each normalized dot image. For example, the dot feature detector 408 in the dot pipeline 406 identifies locations of dots in the normalized dot images 502.

At 708, the autocalibration module detects flood features in each normalized flood image by identifying locations of feature points in the normalized flood images and determining a surrounding context of the feature points. For example, the corner detector 412 identifies features point locations in the normalized flood images and the feature descriptor 414 encodes the feature point locations along with the surrounding context of the feature points.

At 710, the autocalibration module determines flood-feature matches based on a comparison of the flood features between the normalized flood images. For example, the flood feature matcher 416 matches feature locations between the left and right flood images, based on the feature point locations and descriptors to provide flood-feature matches.

At 712, the autocalibration module uses the flood-feature matches to disambiguate the detected dot features and determine dot-feature correspondences between the normalized dot images. In an example, the combined feature matcher 418 uses the flood-feature matches from the flood feature matcher 416 to filter the detected dots from the dot feature detector 408. More specifically, the flood-feature matches are used as anchor points in the dot images to identify additional matches.

At 714, the autocalibration module determines updated-calibration parameters for the stereo near-infrared camera system based on the dot-feature correspondences. In an example, a solver 420, such as the linear solver 534, uses the matched correspondences between the left and right dot images to generate updated-calibration parameters for the NIR camera system 104.

FIG. 8 illustrates an example method 800 for autocalibration for multiple cameras using near-infrared illuminators, in particular, a dot projector. At 802, the autocalibration module receives a pair of dot images from a stereo near-infrared camera system. Here, the pair of dot images 502 (e.g., the left dot image 122 and the right dot image 118) are used for autocalibration purposes without any flood images. The same pair of dot images 502 are used as separate inputs to the dot pipeline 406 and the flood pipeline 410, after being normalized by the local contrast normalizer 404.

At 804, the autocalibration module normalizes a contrast of each dot image to provide a pair of normalized dot images. As above, the local contrast normalizer 404 normalizes the contrast of the dot images 502.

At 806, the autocalibration module detects, in a dot pipeline, dot features in each of the normalized dot images. As described above, the dot feature detector 408 in the dot pipeline 406 identifies locations of dots in the normalized dot images 502.

At 808, the autocalibration module detects, in a flood pipeline, flood features (e.g., dots) in local regions of each of the normalized dot images. Rather than using flood images in the flood pipeline 410, the local contrast normalizer 404 passes normalized dot images to the flood pipeline

410 to determine flood features in the normalized dot images. The flood pipeline can analyze the normalized dot images in limited regions to determine the flood features.

At 810, the autocalibration module determines flood-feature matches based on a comparison of the flood features between the normalized dot images. For example, the flood feature matcher 416 matches feature locations between the left and right dot images, based on feature point locations and descriptors of the flood features.

At 812, the autocalibration module uses the flood-feature matches to disambiguate the detected dot features and determine dot-feature correspondences between the normalized dot images. For example, the combined feature matcher 418 uses dot XY locations from the dot feature detector 408 and anchor point locations from the flood feature matcher 416 to provide additional matches in the dot images 502.

At 814, the autocalibration module determines updated-calibration parameters for the stereo near-infrared camera system 104 based on the dot-feature correspondences. In an example, a solver 420, such as the non-linear solver 602, optimizes the 6-DOF poses of the first NIR camera 110 (e.g., the right camera sensor 306) relative to the second NIR camera 112 (e.g., the left camera sensor 308).

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Example Computing System

Figure 9:
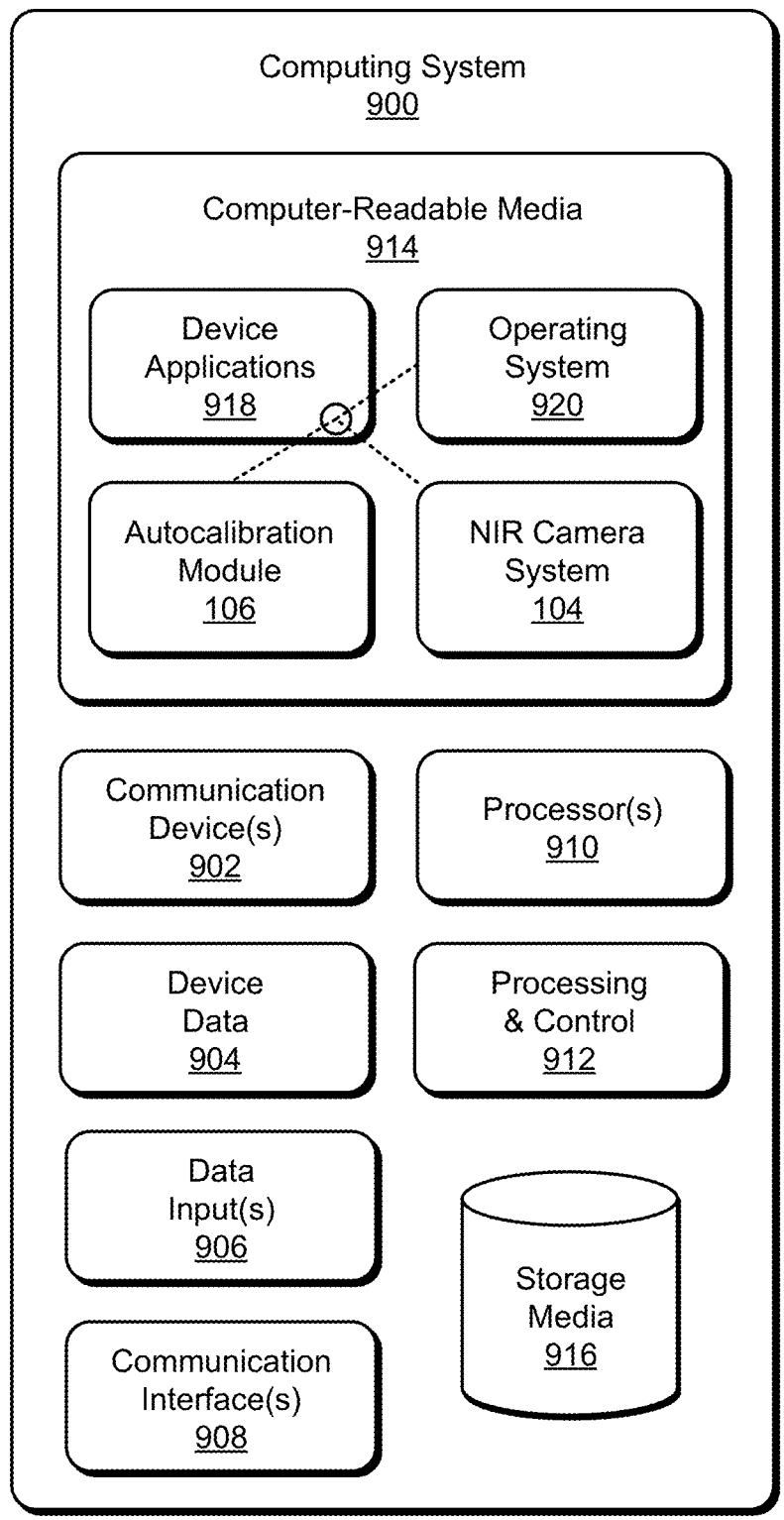
FIG. 9 illustrates an example computing system that can be implemented as any type of client, server, and/or electronic device as described with reference to FIGS. 1-8 to implement, or in which techniques may be implemented that enable, autocalibration for multiple cameras using near-infrared illuminators.

FIG. 9 illustrates various components of an example computing system 900 that can be implemented as any type of client, server, and/or electronic device as described with reference to the previous FIGS. 1-8 to implement techniques for autocalibration of multiple cameras using near-infrared illuminators.

The computing system 900 includes communication devices 902 that enable wired and/or wireless communication of device data 904 (e.g., radar data, authentication data, reference data, received data, data that is being received, data scheduled for broadcast, and data packets of the data). The device data 904 or other device content can include configuration settings of the device, media content stored on the device, and/or information associated with a user of the device (e.g., an identity of a person within a radar field or customized air gesture data). Media content stored on the computing system 900 can include any type of radar, biometric, audio, video, and/or image data. The computing system 900 includes one or more data inputs 906 via which any type of data, media content, and/or inputs can be received, such as human utterances, interactions with a radar field, touch inputs, user-selectable inputs or interactions (explicit or implicit), messages, music, television media content, recorded video content, and any other type of audio, video, and/or image data received from any content and/or data source.

The computing system 900 also includes communication interfaces 908, which can be implemented as any one or more of a serial and/or a parallel interface, a wireless interface, any type of network interface, a modem, and as any other type of communication interface. The communication interfaces 908 provide a connection and/or communication links between the computing system 900 and a communication network by which other electronic, computing, and communication devices communicate data with the computing system 900.

The computing system 900 includes one or more processors 910 (e.g., any of microprocessors, controllers, or other controllers) that can process various computer-executable instructions to control the operation of the computing system 900 and to enable techniques for, or in which can be implemented, autocalibration for multiple cameras using near-infrared illuminators. Alternatively or additionally, the computing system 900 can be implemented with any one or combination of hardware, firmware, or fixed logic circuitry that is implemented in connection with processing and control circuits, which are generally identified at 912. Although not shown, the computing system 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 900 also includes computer-readable media 914, such as one or more memory devices that enable persistent and/or non-transitory data storage (in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 900 can also include a mass storage media device (storage media) 916.

The computer-readable media 914 provides data storage mechanisms to store the device data 904, as well as various device applications 918 and any other types of information and/or data related to operational aspects of the computing system 900. For example, an operating system 920 can be maintained as a computer application with the computer-readable media 914 and executed on the processors 910. The device applications 918 may include a device manager, such as any form of a control application, software application, signal-processing and control modules, code that is native to a particular device, an abstraction module, an air gesture recognition module, and other modules. The device applications 918 may also include system components, engines, modules, or managers to implement autocalibration for multiple cameras using near-infrared illuminators, such as the NIR camera system 104 and the autocalibration module 106. The computing system 900 may also include, or have access to, one or more machine-learning systems.

In the following some examples are given.

Example 1: A method for automatic calibration of multiple cameras in a user device, the method comprising: receiving a plurality of images from a stereo near-infrared camera system, the plurality of images including dot images and flood images; normalizing a contrast of the images to provide normalized dot images and normalized flood images; detecting dot features in each normalized dot image; detecting flood features in each normalized flood image by identifying locations of feature points in the normalized flood images and determining a surrounding context of the feature points; determining flood-feature matches based on a comparison of the flood features between the normalized flood images; using the flood-feature matches to disambiguate the detected dot features to determine dot-feature correspondences between the normalized dot images; and determining updated-calibration parameters for the stereo near-infrared camera system based on the dot-feature correspondences.

Example 2: The method of claim 1, further comprising: prior to determining flood-feature matches, rectifying the feature points based on original calibration parameters of the stereo near-infrared camera system.

Example 3: The method of any one of example 1 or example 2, wherein the determining updated-calibration parameters for the stereo near-infrared camera system comprises applying an iterative solver that minimizes a rectification error between the dot-feature correspondences in the normalized dot images.

Example 4: The method of example 3, wherein the iterative solver optimizes for focal length, roll, and/or vertical shift of a first camera of the stereo near-infrared camera system relative to a second camera of the stereo near-infrared camera system.

Example 5: The method of any one of the preceding examples, further comprising filtering outliers of the flood-feature matches prior to using the flood-feature matches to disambiguate the detected dot features.

Example 6: The method of any one of the preceding examples, wherein using the flood-feature matches to disambiguate the detected dot features includes: using the flood-feature matches as anchor points in the normalized dot images; and identifying additional dot features surrounding the anchor points to resolve ambiguities in the detected dot features of each normalized dot image.

Example 7: The method of any of the preceding examples, wherein the normalizing of the contrast comprises a normalization of the contrast of the dot image and/or flood image in a limited region.

Example 8: The method of any of the preceding examples, wherein the detecting of the dot features uses a matched filter.

Example 9: The method of any of the preceding examples, further comprising rotating each of the dot and flood images before the normalizing of the contrast of the images.

Example 10: The method of any of the preceding examples, further comprising un-distorting and transforming the feature points into a canonical space before the determining of the flood-feature matches.

Example 11: A user device comprising: a stereo near-infrared camera system configured to capture a plurality of images, including dot images and flood images, by using multiple near-infrared illuminators; and a processor and memory system operable to execute stored instructions to implement an autocalibration module configured to perform the method of any one of the preceding examples.

Example 12: A method for automatic calibration of multiple cameras, in a user device, that use near-infrared illuminators, the method comprising: receiving a pair of dot images from a stereo near-infrared camera system; normalizing a contrast of each dot image to provide a pair of normalized dot images; in a dot pipeline, detecting dot features in each of the normalized dot images; in a flood pipeline: detecting flood features in local regions of each of the normalized dot images, the flood features corresponding to feature-point locations and descriptors of surrounding context of the feature-point locations; and determining flood-feature matches based on a comparison of the flood features between the pair of normalized dot images; using the flood-feature matches to disambiguate the detected dot features and determine dot-feature correspondences between the pair of normalized dot images; and determining updated-calibration parameters for the stereo near-infrared camera system based on the dot-feature correspondences.

Example 13: The method of example 12 further comprising: subsequent to detecting flood features and prior to determining flood-feature matches, rectifying the feature-point locations into a canonical space based on original calibration parameters of the stereo near-infrared camera system.

Example 14: The method of any one of example 12 or example 13, wherein: the stereo near-infrared camera system includes first and second near-infrared cameras; and the determining of the updated-calibration parameters includes applying a non-linear solver to the dot-feature correspondences to optimize a six-degrees-of-freedom pose of the first near-infrared camera relative to the second near-infrared camera.

Example 15: The method of example 14 wherein the non-linear solver minimizes a reprojection error.

Example 16: The method of any one of examples 12 to 15, further comprising filtering outliers of the flood-feature matches prior to using the flood-feature matches to disambiguate the detected dot features.

Example 17: The method of any one of examples 12 to 16, wherein using the flood-feature matches to disambiguate the detected dot features includes: using the flood-feature matches to filter the detected dot features to provide anchor points; and correlating additional dot features surrounding the anchor points to resolve ambiguities in the detected dot features between each normalized dot image.

Example 18: The method of any one of examples 12 to 17, wherein the determining of the flood-feature matches includes filtering the flood-feature matches based on a similarity threshold between first and second best candidates for a flood-feature match between the pair of normalized dot images.

Example 19: The method of any of the examples 12 to 18, wherein the normalizing of the contrast comprises normalizing the contrast of each dot image in a limited region.

Example 20: The method of any of the examples 12 to 19, wherein the detecting of the dot features uses a matched filter.

Example 21: The method of any of the examples 12 to 20, further comprising rotating each dot image before the normalizing of the contrast of each dot image.

Example 22: The method of any of the examples 12 to 21, further comprising un-distorting and transforming the feature points into a canonical space before the determining of the flood-feature matches.

Example 23: A user device comprising: a stereo near-infrared camera system configured to use a dot projector to capture a pair of near-infrared dot images; and a processor and memory system operable to execute stored instructions to implement an autocalibration module configured to perform the method of any one of examples 12 to 22.

Conclusion

Although implementations of techniques for, and apparatuses enabling autocalibration for multiple cameras using near-infrared illuminators have been described in language specific to features and/or methods, it is to be understood that the subject of the appended claims is not necessarily limited to the specific features or methods described. Rather, the specific features and methods are disclosed as example implementations for autocalibration for multiple cameras using near-infrared illuminators.

What is claimed is:

1. A method for automatic calibration of multiple cameras, in a user device, that use near-infrared illuminators, the method comprising:
receiving a pair of dot images from a stereo near-infrared (NIR) camera system, each dot image of the pair of dot images comprising a dot pattern corresponding to a plurality of NIR dots projected onto a subject by a dot projector and captured by the stereo NIR camera system;
normalizing a contrast of each dot image to provide a pair of normalized dot images;
outputting a first instance of the pair of normalized dot images to a dot pipeline and a second instance of the pair of normalized dot images to a flood pipeline, the dot pipeline configured for processing dot images having patterns of NIR dots, the flood pipeline configured for processing flood images of a subject illuminated with a dedicated flash of NIR light;
in the dot pipeline, detecting dot features in each of the normalized dot images of the first instance of the pair of normalized dot images;
in the flood pipeline:
detecting flood features in local regions of each of the normalized dot images of the second instance of the pair of normalized dot images, the flood features corresponding to feature-point locations and descriptors of surrounding context of the feature-point locations; and
determining flood-feature matches based on a comparison of the flood features between the normalized dot images of the second instance of the pair of normalized dot images;
using the determined flood-feature matches from the flood pipeline to disambiguate the detected dot features from the dot pipeline and determine dot-feature correspondences between the pair of normalized dot images; and
determining updated-calibration parameters for the stereo near-infrared camera system based on the dot-feature correspondences.

2. The method as recited in claim 1, further comprising:
subsequent to detecting flood features and prior to determining flood-feature matches, rectifying the feature-point locations into a canonical space based on original calibration parameters of the stereo near-infrared camera system.

3. The method as recited in claim 1, wherein:
the stereo near-infrared camera system includes first and second near-infrared cameras; and
the determining of the updated-calibration parameters includes applying a non-linear solver to the dot-feature correspondences to optimize a six-degrees-of-freedom pose of the first near-infrared camera relative to the second near-infrared camera.

4. The method as recited in claim 3, wherein the non-linear solver minimizes a reprojection error.

5. The method of claim 1, further comprising filtering outliers of the flood-feature matches prior to using the determined flood-feature matches to disambiguate the detected dot features.

6. The method as recited in claim 1, wherein using the determined flood-feature matches to disambiguate the detected dot features includes:
using the determined flood-feature matches to filter the detected dot features to provide anchor points; and
correlating additional dot features surrounding the anchor points to resolve ambiguities in the detected dot features between each normalized dot image of the pair of normalized dot images.

7. The method as recited in claim 1, wherein the determining of the flood-feature matches includes filtering the flood-feature matches based on a similarity threshold between first and second best candidates for a flood-feature match between the pair of normalized dot images.

8. The method as recited in claim 1, further comprising un-distorting and transforming the feature-point locations into a canonical space before the determining of the flood-feature matches.

9. A user device comprising:
a stereo near-infrared (NIR) camera system configured to use a dot projector to capture a pair of NIR dot images, each dot image of the pair of NIR dot images comprising a dot pattern corresponding to a plurality of NIR dots projected onto a subject by the dot projector and captured by the stereo NIR camera system; and
a processor and memory system operable to execute stored instructions to implement an autocalibration module configured to:
normalize a contrast of each dot image to provide a pair of normalized dot images;
output a first instance of the pair of normalized dot images through a dot pipeline and a second instance of the pair of normalized dot images through a flood pipeline, the dot pipeline configured for processing dot images having a pattern of NIR dots, the flood pipeline configured for processing flood images of a subject illuminated with a dedicated flash of NIR light;
in the dot pipeline, detect dot features in each of the normalized dot images of the first instance of the pair of normalized dot images;
in the flood pipeline:
detect flood features in local regions of each of the normalized dot images of the second instance of the pair of normalized dot images, the flood features corresponding to feature-point locations and descriptors of surrounding context of the feature-point locations; and
determine flood-feature matches based on a comparison of the flood features between the normalized dot images of the second instance of the pair of normalized dot images;
disambiguate the detected dot features from the dot pipeline using the flood-feature matches from the flood pipeline to provide disambiguated dot features;
determine dot-feature correspondences between the pair of normalized dot images using the disambiguated dot features; and
determine updated-calibration parameters for the stereo near-infrared camera system based on the dot-feature correspondences.

10. The user device as recited in claim 9, wherein the autocalibration module is further configured to, subsequent to detection of the flood features and prior to a determination of the flood-feature matches, rectify the feature-point locations into a canonical space based on original calibration parameters of the stereo near-infrared camera system.

11. The user device as recited in claim 9, wherein:
the stereo near-infrared camera system includes first and second near-infrared cameras; and
the updated-calibration parameters are determined based on an application of a non-linear solver to the dot-feature correspondences to optimize a six-degrees-of-freedom pose of the first near-infrared camera relative to the second near-infrared camera.

12. The user device as recited in claim 9, wherein the non-linear solver minimizes a reprojection error.

13. The user device as recited in claim 9, wherein the autocalibration module is further configured to filter outliers of the determined flood-feature matches prior to using the determined flood-feature matches to disambiguate the detected dot features.

14. The user device as recited in claim 9, wherein the autocalibration module is further configured to:
use the determined flood-feature matches to filter the detected dot features to provide anchor points; and
correlate additional dot features surrounding the anchor points to resolve ambiguities in the detected dot features between each normalized dot image in the pair of normalized dot images.

15. The user device as recited in claim 9, wherein the autocalibration module is further configured to filter the flood-feature matches based on a similarity threshold between first and second best candidates for a flood-feature match between the pair of normalized dot images.

16. The user device as recited in claim 9, wherein the autocalibration module is further configured to un-distort and transform the feature-point locations into a canonical space before the flood-feature matches are determined.

17. One or more computer readable media having instructions that, responsive to execution by a computer processor, cause the computer processor to implement an autocalibration module configured to:
receive a pair of dot images from a stereo near-infrared (NIR) camera system, each dot image of the pair of dot images comprising a dot pattern corresponding to a plurality of NIR dots projected onto a subject by a dot projector and captured by the stereo NIR camera system;
normalize a contrast of each dot image to provide a pair of normalized dot images;
output a first instance of the pair of normalized dot images through a dot pipeline and a second instance of the pair of normalized dot images through a flood pipeline, the dot pipeline configured for processing dot images having a pattern of NIR dots, the flood pipeline configured for processing flood images of a subject illuminated with a dedicated flash of NIR light;
in the dot pipeline, detect dot features in each of the normalized dot images of the first instance of the pair of normalized dot images;
in the flood pipeline:
detect flood features in local regions of each of the normalized dot images of the second instance of the pair of normalized dot images, the flood features corresponding to feature-point locations and descriptors of surrounding context of the feature-point locations; and
determine flood-feature matches based on a comparison of the flood features between the normalized dot images of the second instance of the pair of normalized dot images;
use the determined flood-feature matches from the flood pipeline to disambiguate the detected dot features from the dot pipeline and determine dot-feature correspondences between the pair of normalized dot images; and
determine updated-calibration parameters for the stereo near-infrared camera system based on the dot-feature correspondences.

18. The one or more computer-readable media as recited in claim 17, wherein:
the stereo near-infrared camera system includes first and second near-infrared cameras; and
the determining of the updated-calibration parameters includes applying a non-linear solver to the dot-feature correspondences to optimize a six-degrees-of-freedom pose of the first near-infrared camera relative to the second near-infrared camera.

19. The one or more computer-readable media as recited in claim 18, wherein the non-linear solver minimizes a reprojection error.

20. The one or more computer-readable media as recited in claim 17, wherein using the determined flood-feature matches to disambiguate the detected dot features includes:
using the determined flood-feature matches to filter the detected dot features to provide anchor points; and
correlating additional dot features surrounding the anchor points to resolve ambiguities in the detected dot features between each normalized dot image of the pair of normalized dot images.

\* \* \* \* \*